United States Patent
Durham et al.

(10) Patent No.: US 10,584,636 B2
(45) Date of Patent: Mar. 10, 2020

(54) DEBRIS FILTER APPARATUS FOR PREVENTING CLOGGING OF TURBINE VANE COOLING HOLES

(71) Applicant: MITSUBISHI HITACHI POWER SYSTEMS AMERICAS, INC., Lake Mary, FL (US)

(72) Inventors: Michael G. Durham, Orlando, FL (US); Scott T. Cloyd, Howey-in-the-Hills, FL (US); Ramy A. Massoud, Orlando, FL (US); Antonio A. Melo, Orlando, FL (US); Tomoko Morikawa, Takasago (JP); Noah J. Rowe, Orlando, FL (US)

(73) Assignee: MITSUBISHI HITACHI POWER SYSTEMS AMERICAS, INC., Lake Mary, FL (US)

( * ) Notice: Subject to any disclaimer, the term of this patent is extended or adjusted under 35 U.S.C. 154(b) by 428 days.

(21) Appl. No.: 15/418,258

(22) Filed: Jan. 27, 2017

(65) Prior Publication Data

US 2018/0363553 A1 Dec. 20, 2018

(51) Int. Cl.
| | |
|---|---|
| *F02C 7/052* | (2006.01) |
| *F02C 7/055* | (2006.01) |
| *F01D 25/00* | (2006.01) |
| *F01D 9/06* | (2006.01) |
| *B01D 46/10* | (2006.01) |
| *B01D 46/52* | (2006.01) |

(52) U.S. Cl.
CPC .............. *F02C 7/052* (2013.01); *F01D 9/065* (2013.01); *F01D 25/002* (2013.01); *F02C 7/055* (2013.01); *B01D 46/10* (2013.01); *B01D 46/521* (2013.01); *B01D 2279/60* (2013.01); *F05D 2230/237* (2013.01); *F05D 2240/129* (2013.01); *F05D 2250/30* (2013.01); *F05D 2250/70* (2013.01); *F05D 2260/607* (2013.01)

(58) Field of Classification Search
CPC ........ F02C 7/055; F02C 7/052; B01D 46/521; B01D 46/52; F05D 2260/607; F01D 25/002; F01D 25/32; F01D 9/065; F01D 9/04; F01D 5/18; F01D 5/186; F01D 5/187
See application file for complete search history.

(56) References Cited

U.S. PATENT DOCUMENTS

| | | | | |
|---|---|---|---|---|
| 4,820,123 A | * | 4/1989 | Hall | ........................ F01D 5/081 416/92 |
| 5,062,768 A | | 11/1991 | Marriage | |
| 5,397,632 A | * | 3/1995 | Murphy, Jr. | ........ B01D 39/1623 442/358 |

(Continued)

*Primary Examiner* — Dwayne J White
*Assistant Examiner* — Jackson N Gillenwaters
(74) *Attorney, Agent, or Firm* — Westerman, Hattori, Daniels & Adrian, LLP (57) ABSTRACT

A turbine debris filter apparatus for preventing clogging of cooling holes of a turbine vane, the apparatus including a filter having non-planar geometry configured to be disposed upon a shroud of the turbine vane and a support including an interface to which the filter is attached and an opening for allowing air flow, wherein the interface is configured to receive and support the non-planar geometry and the opening is configured to align with an air inlet of the shroud.

18 Claims, 7 Drawing Sheets

(56) References Cited

U.S. PATENT DOCUMENTS

| | | | | |
|---|---|---|---|---|
| 5,674,302 | A | * | 10/1997 | Nakayama ......... B01D 46/0001 |
| | | | | 210/493.1 |
| 7,665,965 | B1 | * | 2/2010 | Liang ..................... F01D 5/18 |
| | | | | 416/1 |
| 8,176,720 | B2 | | 5/2012 | Beeck |
| 8,257,459 | B2 | * | 9/2012 | Healey .............. B01D 39/1623 |
| | | | | 55/486 |
| 8,864,438 | B1 | * | 10/2014 | Lee ....................... F01D 5/188 |
| | | | | 415/1 |
| 9,334,754 | B2 | * | 5/2016 | Khanin ................... F01D 5/187 |
| 2003/0022584 | A1 | * | 1/2003 | Latimer ............ A61F 13/53436 |
| | | | | 442/414 |
| 2007/0048122 | A1 | | 3/2007 | Van Suetendael et al. |
| 2009/0214329 | A1 | | 8/2009 | Joe et al. |
| 2013/0192257 | A1 | | 8/2013 | Horine et al. |
| 2018/0223674 | A1 | * | 8/2018 | Taylor .................... F01D 5/186 |

* cited by examiner

DEBRIS FILTER APPARATUS FOR PREVENTING CLOGGING OF TURBINE VANE COOLING HOLES

BACKGROUND

Field of Invention

The present invention relates to a debris filter apparatus configured to be attached to a shroud of a turbine vane to prevent clogging of downstream turbine vane cooling holes while still allowing adequate air flow to the cooling holes.

Description of Related Art

A typical gas turbine engine includes a compressor for compressing air, a combustor for mixing the compressed air with fuel, and a turbine assembly, with alternating rows of vanes and blades, for producing power. A first row of turbine vanes is exposed to hot gas temperatures in excess of the melting point of the vane material. Various cooling techniques are used to ensure that the maximum metal temperature does not exceed the melting point. One of these cooling techniques involves flowing relatively cool air from the compressor through an array of holes in the turbine vane. The cooling air from the compressor may include debris such as dirt, rust, and insulation, for example. The debris can accumulate within and clog the cooling holes in the vane. Clogging can result in vane material oxidation, and may require vane replacement prior to a scheduled service interval.

Prior art approaches include filtration systems located at an inlet of the engine. However, since debris that blocks the cooling holes of the turbine vane may be generated within the engine itself, the benefit of these approaches are limited. Another prior art approach to prevent clogging of turbine vane cooling holes involves strategic drilling of the cooling holes. This may result in extended use intervals before the vane holes clog, without substantially increasing coolant flow rate. For example, as described in U.S. Pat. No. 5,062,768, intersecting cylindrical holes are drilled such that the flow constriction is located at the point of intersection and the holes overlap to form a single outlet larger than that which would result from either hole individually. Another prior art approach to prevent clogging of turbine vane cooling holes involves use of a device embedded in the turbine vane itself. For example, as described in U.S. Pat. No. 8,176,720, a centrifugal particle separator is embedded within a platform (or root) of a turbine blade or shroud(s) of a turbine vane to remove dirt and dust particles from the compressed cooling air.

Additional prior art approaches, for example, as described in US Patent Application Nos. 2007/0048122, 2009/0214329 and 2013/0192257 pertain to the application of a filter to cooling flow through a blade outer air seal (also referred to as a "ring segment"). More specifically, US Patent Application No. 2007/0048122 describes an individual filter integrated into the blade outer air seal for each cooling hole, US Patent Application No. 2009/0214329 describes a filter placed immediately outside and upstream of the impingement cavity of the blade outer air seal, and US Patent Application No. 2013/0192257 describes a filter placed immediately upstream of one or more cooling holes in a turbine shroud hanger (also referred to as an "isolation ring") that feeds cooling flow to the blade outer air seal.

These prior art approaches are prone to starvation of the vane cooling holes caused by filter clogging.

It is to be understood that the foregoing general description and the following detailed description are exemplary and explanatory and are not restrictive of the invention, as claimed.

SUMMARY

In view of these circumstances, an aspect of the present invention is to provide a turbine debris filter apparatus or assembly for preventing clogging of cooling holes of a turbine vane, the apparatus comprising a filter comprising non-planar geometry configured to be disposed upon a shroud of the turbine vane and a support comprising an interface to which the filter is attached and an opening for allowing air flow, wherein the interface is configured to receive and support the non-planar geometry and the opening is configured to align with an air inlet of the shroud.

Another aspect of the present invention is to provide a turbine debris filter apparatus or module that avoids starvation of the vane cooling holes caused by clogging of a filter by including or forming a non-planar geometry in the filter which increases the amount of cooling air flowing through the filter and compensates for any potential air flow loss due to a support that is attached to the perimeter of an air inlet in a shroud of a turbine vane and/or any potential air flow loss due to the mesh wires of the filter itself.

Another aspect of the present invention is to provide a turbine debris filter apparatus that does not require a redesign of the vane itself and properly seals the flow circuit of the vane cooling holes being protected of an existing or new turbine vane to ensure that debris is removed from the relatively cool air flowing from the compressor to prevent the clogging of the vane cooling holes while still providing for adequate air flow to the cooling channels of the turbine vane.

Another aspect of the present invention is to ensure that the air flow paths to the inlets of the two vane side cooling channels are left unobstructed while a seal that is able to prevent leakage gaps caused by thermal distortion of the turbine vane during operation is achieved between the debris filter apparatus and the turbine vane in the vicinity of the cooling channel inlets.

BRIEF DESCRIPTION OF THE DRAWINGS

Further characteristics and advantages of the present invention will be more readily apparent from the description of the preferred by non-exclusive embodiments of the debris filtering apparatus, illustrated by way of non-limiting examples in the accompanying drawings, in which.

The same reference numerals are used to identify similar elements in the Figures.

DESCRIPTION OF THE INVENTION

Figure 1:
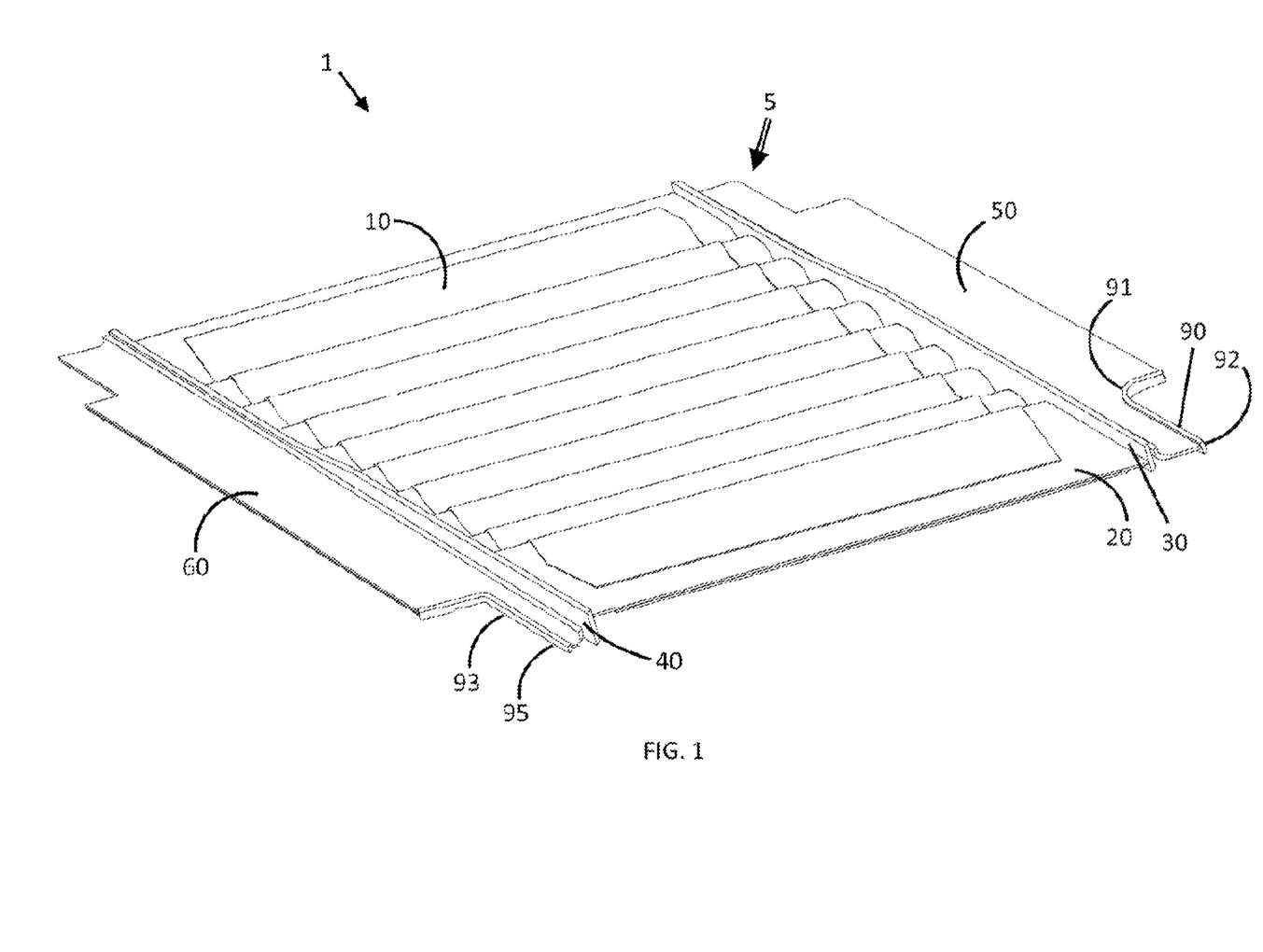
FIG. 1 shows an isometric view of a debris filter apparatus according to an embodiment according to the present invention.
Figure 2:
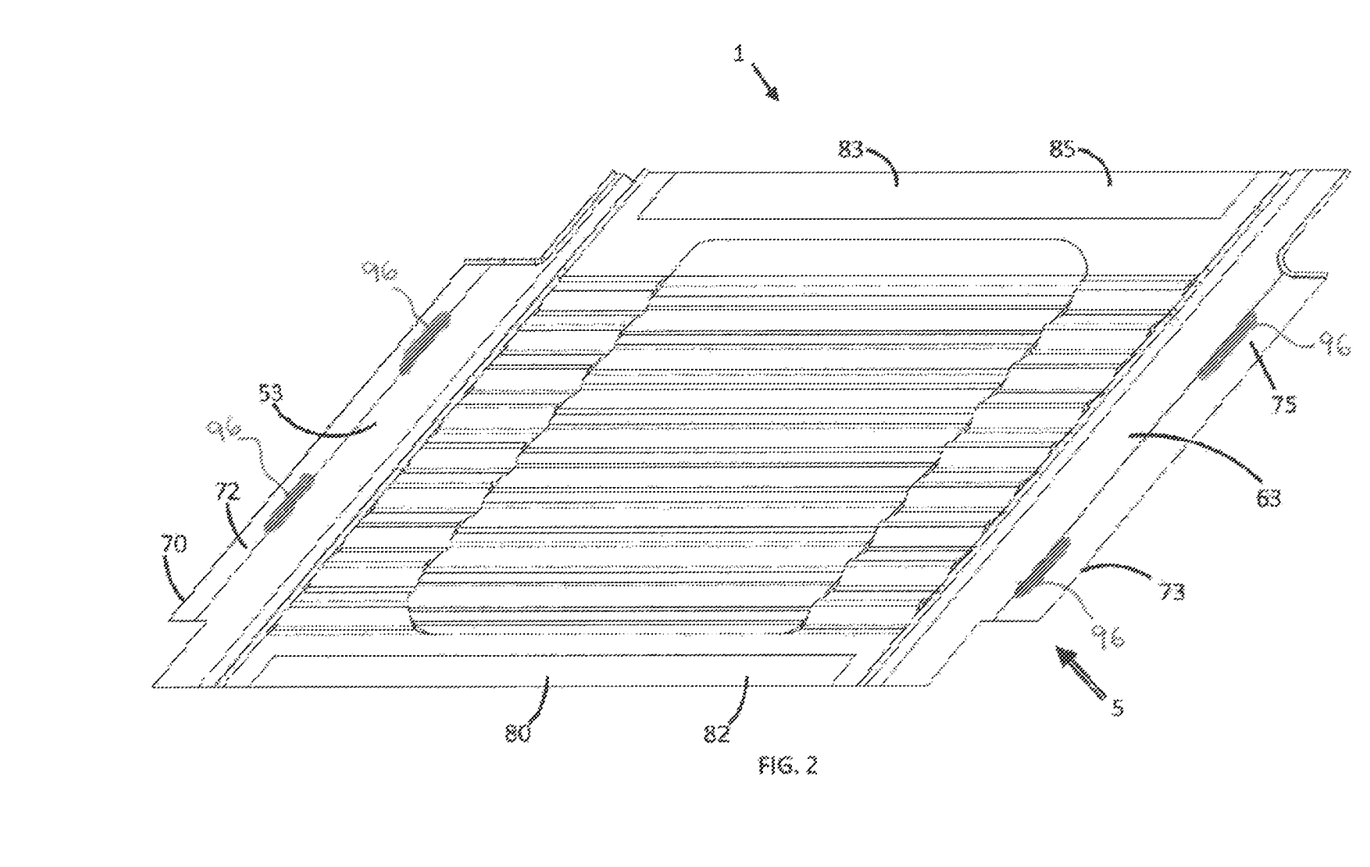
FIG. 2 shows an orthographic view of a debris filter apparatus according to an embodiment according to the present invention.
Figure 3:
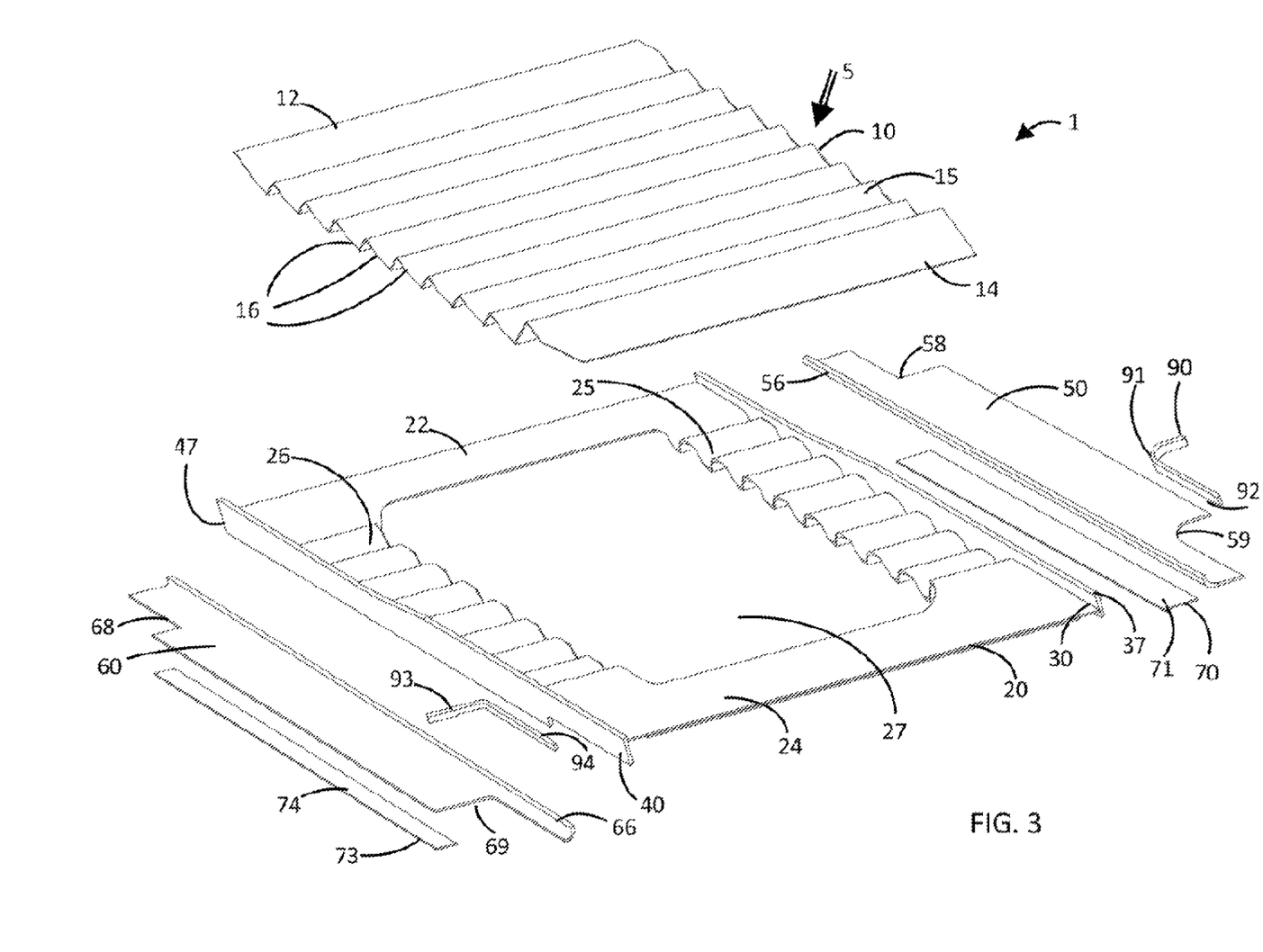
FIG. 3 shows an exploded view of a debris filter apparatus according to an embodiment according to the present invention.
Figure 4:
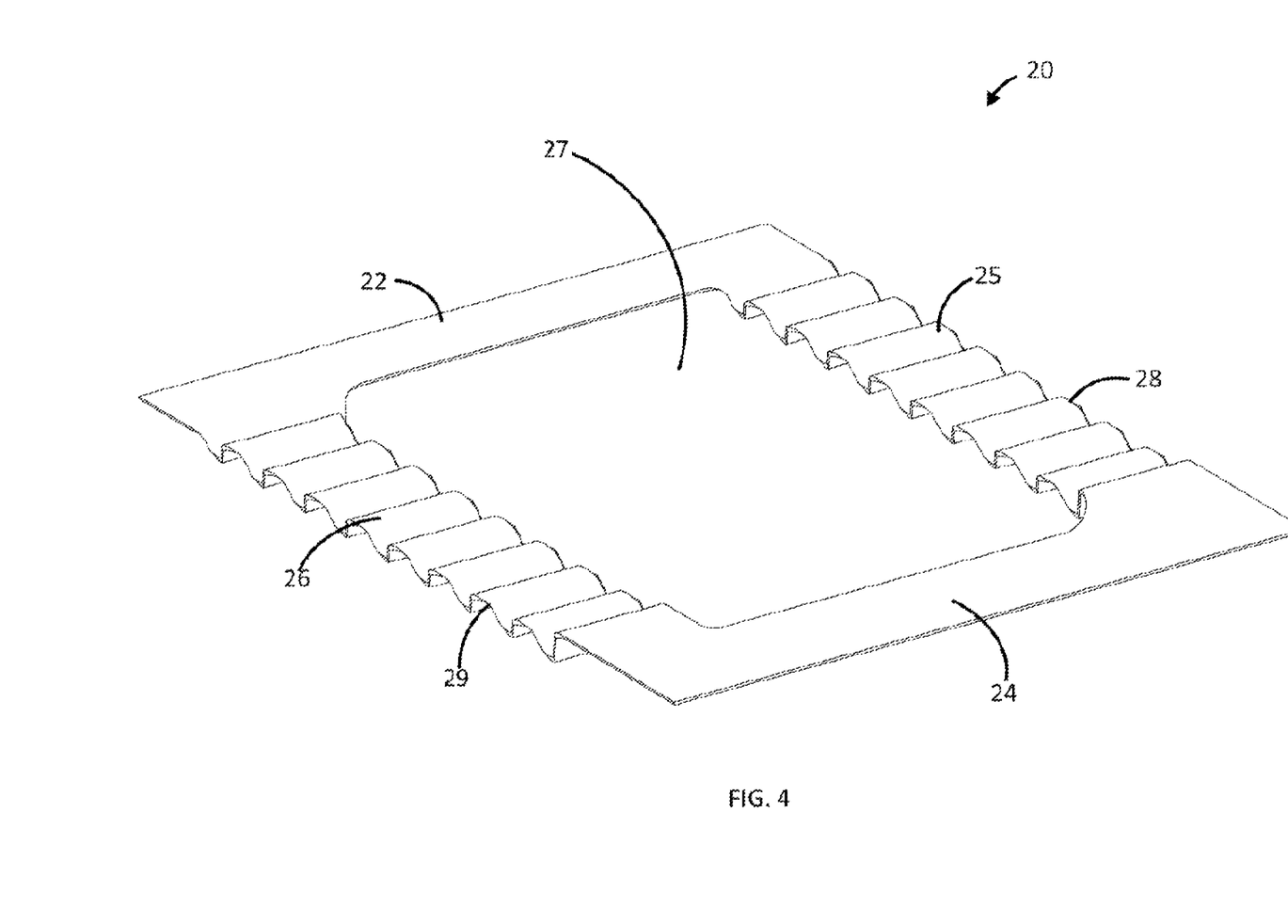
FIG. 4 shows an isometric view of a filter support according to an embodiment according to the present invention.

FIG. 1 illustrates a debris filter apparatus 1 according to an embodiment of the present invention. As shown in FIGS. 1-3, the debris filter apparatus 1 may include a filter 10 and a filter support 20 (also referred to herein as a "support"). In addition, as shown in FIGS. 1-3, the debris filter apparatus 1 may also include right and left side plates 30, 40, right and left flanges 50, 60, right and left clearance plates 70, 73, and front and rear reinforcement plates 80, 83. Right and left corner sealing pieces 90, 93 may be used to enhance the mounting of the apparatus 1 to the frame of an inner shroud 2 (see FIG. 6) of a turbine vane 7, as well as to enhance the seal between the apparatus 1 and the inner shroud 2 of a turbine vane 7 in the vicinity of the cooling channel inlet 3. As one of ordinary skill in the art can readily appreciate, in any particular embodiment, the debris filter apparatus 1 can be similarly mounted to the outer shroud (not shown) of the turbine vane.

Figure 6:
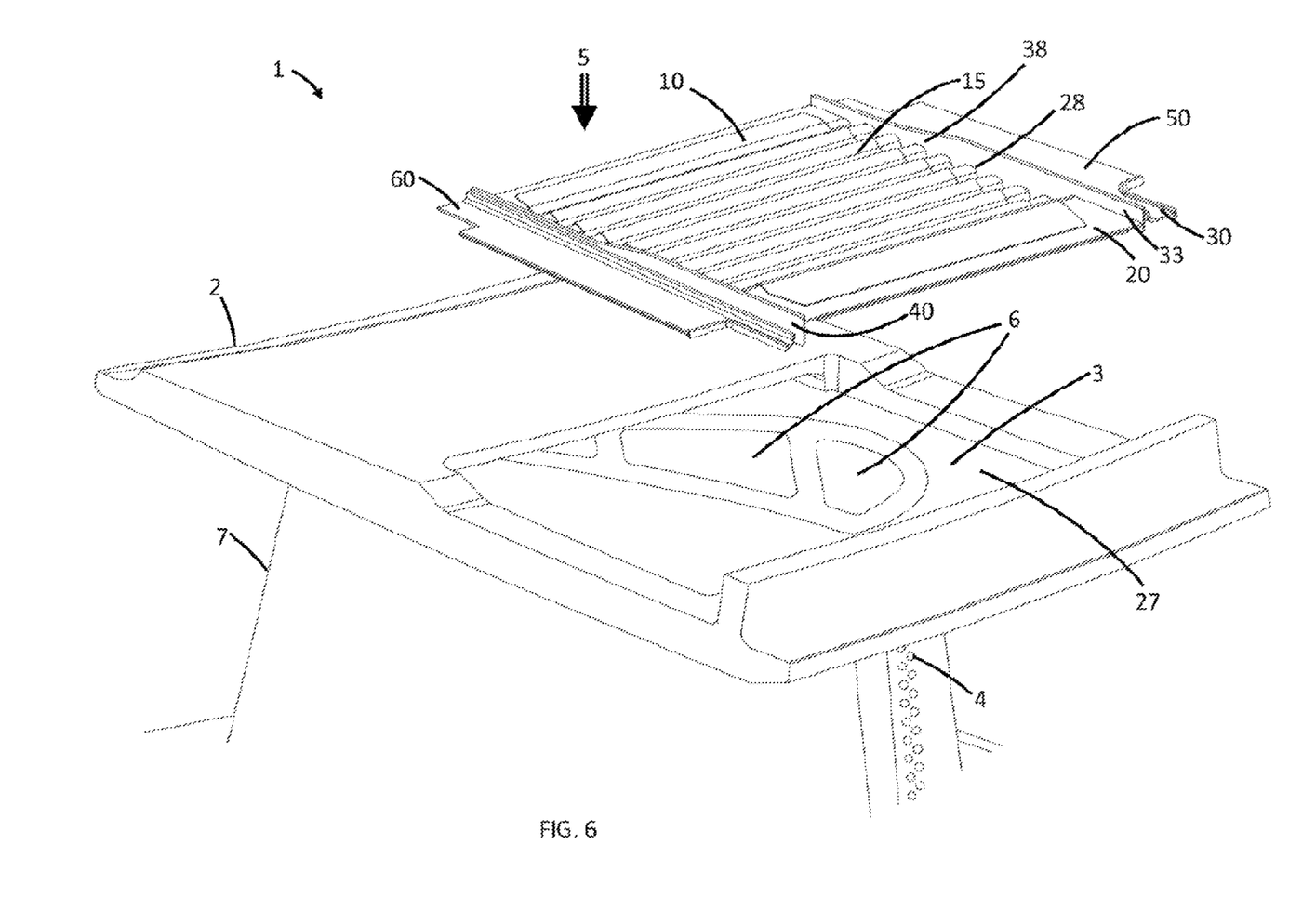
FIG. 6 shows an exploded view of a debris filter apparatus according to an embodiment of the present invention.

As shown in FIG. 6, the debris filter apparatus 1 may be mounted on the frame of the inner shroud 2 of the turbine vane to cover an air inlet 3 in the inner shroud 2 such that debris particles are collected by the debris filter apparatus 1 upstream of the turbine vane cooling holes 4 in order to prevent clogging of the vane cooling holes 4. For example, the debris filter apparatus 1 is configured to filter any debris that may be included in the cooling air received from a compressor (not shown) before it reaches the vane cooling holes 4.

As shown in FIG. 3, the filter 10 includes a rear portion 12, a front portion 14 and a non-planar geometry portion 15, which by way of a non-limiting example, is formed into a three-dimensional corrugated shape and includes a plurality of corrugated segments 16. Each of the corrugated segments 16 may be of the same or different size/height or pitch and may be provided an equal or non equal distance apart from each other. The filter 10 may be constructed of a wire cloth, mesh or screen woven from metal wires. The filter 10 includes a plurality of mesh openings (not shown) which are sized to allow air flow 5 through to the vane cooling holes 4 while preventing the entry of debris particles. Specifically, the size of the mesh openings can vary between 10 to 90 percent of the diameter of the vane cooling holes 4 that are being protected by the filter 10. The filter 10 may be constructed of a material (for example, Hastelloy x and other nickel-based superalloys utilized for aerospace purposes) having a rate of metal loss due to oxidation that results in a wire diameter decrease of no greater than 10% over the filter service life at base load operating temperatures. In an embodiment, the filter 10 material may be selected to provide an ultimate tensile strength such that the stress level in the wire cloth due to the maximum possible pressure differential caused by clogging of the filter 10 during operation is less than 90% of the material ultimate tensile strength. As used herein, the term "Non-planar geometry" shall refer to a non-planar displacement of the filter material, such that the overall surface area is increased, and may include various geometric embodiments. For example, repeating geometric displacements having sinusoidal, saw-tooth, and orthogonal displacements, that may be disposed in parallel, circumferential, or other arrangements. Furthermore, the scope of this disclosure shall also include a singular, non-repeating displacement, such as dome shape, for example.

Pressure drop across the filter 10, particularly in response to capture or clogging of debris, is inversely related to filter 10 surface area. In an embodiment, corrugations are provided to increase the effective open surface area of the non-planar geometry portion 15 of the filter 10 and provide margin for debris accumulation before a pressure drop substantially reduces the cooling effectiveness of the air flow 5 passing through the filter 10. In an embodiment, by way of a non-limiting example, the corrugated segments 16 have a height that accommodates placement of the filter apparatus 1 adjacent to structures of the vane 7 such that the filter apparatus does not interfere with any of the vane 7 structures. Additionally, open surface area gained by the use of the non-planar geometry section 15 compensates for surface area lost by the presence of the mesh material of the filter 10 as well as the solid material of the filter support 20 around the perimeter of the air opening 3 in the vane 7 through which the cooling air flows 5. For example, even for a filter 10 having mesh opening size at the lower limit of the (previously discussed) range of only 10% of the diameter of the vane cooling holes 4 being protected, the increase of surface area provided by the non-planar geometry section 15 can provide an open surface area of over 200% greater than the effective area of the vane cooling holes 4.

As shown in FIGS. 1-4, the filter support 20 includes a rear portion 22, a front portion 24, a right non-planar geometry section 25, a left non-planar geometry section 26, an opening 27, a right edge portion 28 and a left edge portion 29. As shown in FIG. 1, the filter 10 is overlaid on the support 20 such that the non-planar geometry portion 15 covers the opening 27 and is provided on the right and left non-planar geometry sections 25, 26 of the filter support 20. By way of a non-limiting example, the right and left non-planar geometry sections 25 and 26 may by formed into three dimensional corrugated shapes that correspond to the shape and size of the segments 16 of the non-planar geometry portion 15. In addition, the rear and front portions 12, 14 of the filter 10 are respectively overlaid on the rear and front portions 22, 24 of the filter support 20. The filter 10 is secured to the filter support 20 with mechanical fasteners or bonded together by welding and/or brazing. Thus, the non-planar geometry portion 15 covering the opening 27 collects the debris before it reaches the downstream vane cooling holes 4, thereby preventing premature clogging of the holes 4 (see FIG. 6).

The filter support 20 has a relatively flexible frame geometry. Accordingly thermal distortion of the turbine vane 7 during operation does not cause any stresses within the frame of the filter support 20 that exceed the yield stress thereof. That is, the filter support 20 includes a sheet metal construction which, along with the use of the non-planar geometry sections 25, 26, provides the necessary flexibility to accommodate thermal distortion of the turbine vane 7. Further, the wire cloth of the filter 10, frame sheet metal materials of the filter support 20, and non-planar geometry were chosen to have sufficient strength to prevent collapse of the filter apparatus 1 as debris builds up within the filter 10. In an embodiment, as debris accumulates and pressure drop across the filter increases, the materials and geometry of the apparatus 1 provide sufficient thickness and oxidation resistance to prevent failure due to oxidation and corrosion at its operating temperature, as well as a thermal expansion coefficient similar to that of the turbine vane to avoid stresses resulting from differential thermal expansion.

According to an embodiment of the present invention, the debris filter apparatus 1 may include the filter 10 secured to the filter support 20, with the filter support 20 being attached to the frame of the inner shroud 2 of the turbine vane 7. More specifically, the rear and front portions 22 and 24 of the filter support 20 are secured, e.g., by welding, to the frame of the inner shroud 2 of a turbine vane. The filter support may be attached to the frame of the inner shroud 2 of an existing vane (as a retrofit) or to a new turbine vane.

The opening 27 of the filter support 20 is aligned with the air inlet 3 of the inner shroud 2. For example, as shown in FIG. 6, when the filter 10 and the filter support 20 are mounted on the inner shroud 2 of the turbine vane, the opening 27 of the filter support 20 has a perimeter that spans the entirety of the air inlet opening 3 in the inner shroud 2 of the turbine vane through which the cooling air 5 flows and seals the flow circuit of the vane cooling holes 4 being protected.

Figure 7:
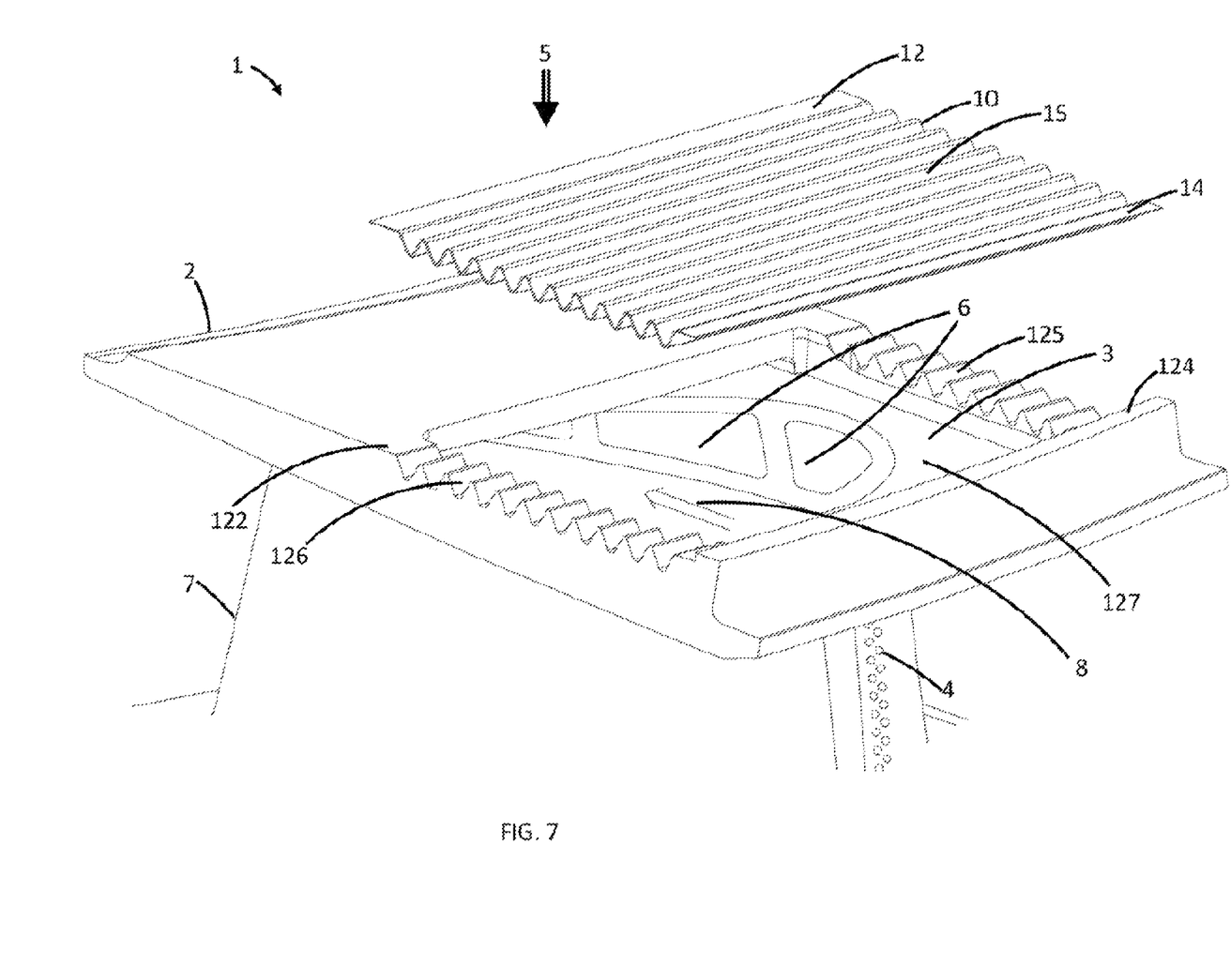
FIG. 7 shows an exploded view of a debris filter apparatus according to another embodiment of the present invention.

According to another embodiment of the present invention, as shown in FIG. 7, the shroud 2 of the vane 7 comprises a right non-planar geometry section 125, a left non-planar geometry section 126 and an opening 127 that are configured to provide a support for receiving the matching non-planar geometry portion 15 of the filter 10. In addition, the rear and front portions 12, 14 of the filter 10 are respectively overlaid on the rear and front portions 122, 124 of the inner shroud 2. The filter 10 is secured to the shroud 2 with mechanical fasteners or bonded together by welding and/or brazing. Thus, the non-planar geometry portion 15 covering the opening 127 collects the debris before it reaches the downstream vane cooling holes 4, thereby preventing premature clogging of the holes 4. Cross-flow 8, which is airflow on the inside of the filter apparatus 1, ensures that air flowing through any portion of the filter 10 can flow into any of the cooling channels 6 between the filter apparatus 1 and the vane cooling holes 4. Cross-flow can mitigate starvation of the holes 4 in the event that a portion of the filter 10 proximate to any one of the cooling channels 6 is blocked by debris. In an embodiment, the cross-flow flow area (in a direction perpendicular to the bulk direction of the flow 5 through the filter 10) must be at least 200% greater than the effective area of the cooling holes 4. This arrangement may be used to determine the position in which the wire cloth 10 is held by the shroud 2 or filter support 20 to provide sufficient clearance between the underside of the filter 10 and the cooling channels 6.

According to another embodiment of the present invention, the debris filter apparatus 1 may include additional elements to enhance its geometric structure for mounting to the turbine vane and to enhance the seal of the apparatus 1 with the flow circuit of the vane cooling holes 4 being protected. As noted above, the debris filter apparatus 1 may also include light and left side plates 30, 40, right and left flanges 50, 60, right and left clearance plates 70, 73, right and left reinforcement plates 80, 83 and right and left corner sealing pieces 90, 93, which may be used to facilitate the mounting of the apparatus 1 to the frame of an existing or new inner shroud 2 of a turbine vane and to achieve a seal between the debris filter apparatus 1 and the turbine vane 2 in the vicinity of the cooling channel inlet 3.

Figures 5A, 5B:
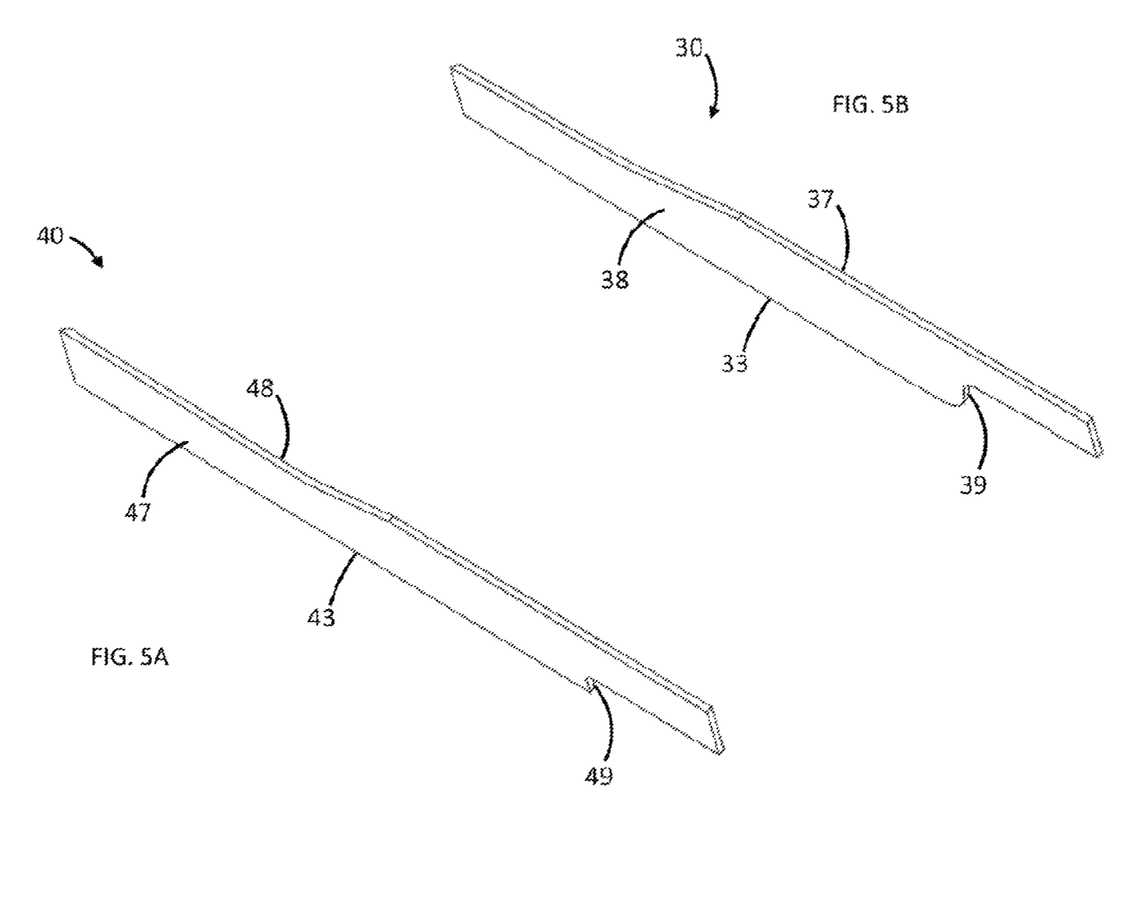
FIGS. 5A and 5B show a perspective view of right and left side plates according an embodiment of the present invention.

As shown in FIG. 5A, the right side plate 30 includes a bottom edge surface 33, an outer surface 37, an inner surface 38 and a front recessed portion 39. Similarly, as shown in FIG. 5B, the left side plate 40 includes a bottom edge surface 43, an outer surface 47, an inner surface 48 and a front recessed portion 49.

As shown in FIGS. 1 and 3, the right and left side plates 30, 40 are attached substantially in parallel to opposite sides of the filter support 20, for example, by an intermittent fillet weld. The inner surfaces 38, 48 are at substantially right angles to the right and left edge portions 28 and 29 of the filter support 20, respectively, see FIGS. 5A and 5B. The front recess portions 39, 49 of the right and left side plates 30, 40 provide the necessary clearance for existing vane hardware when the debris filter apparatus 1 is mounted on the inner shroud 2 as shown in FIG. 6. The bottom edge surfaces 33, 43 may be secured, e.g., by welding, to the frame of the inner shroud 2 on either an existing (retrofit) or new turbine vane.

As shown in FIGS. 1-3, the right side flange 50 has an L-shaped cross section and includes a bottom surface 53, an inner edge expanded surface 56, a rear recess portion 58 and a front recess portion 59. Similarly, as shown in FIGS. 1-3, the left side flange 60 has an L-shaped cross section and includes a bottom surface 63, an inner edge expanded surface 66, a rear recess portion 68 and a front recess portion 69. The front recess portions 59, 69 each have a parallelogram shape for receiving right and left corner sealing pieces 90, 93, which enhances the seal between the filter apparatus 1 and the shroud 2 of the vane around the cooling channel inlet 3.

As shown in FIGS. 1 and 3, the flanges 50, 60 are attached to the outside surfaces 37, 47 of the side plates 30, 40 via a continuous fillet weld. More specifically, the inner edge expanded surfaces 56, 66 of the right and left flange portions 50, 60 are attached substantially in parallel, for example, by welding, to the outer surfaces 37 and 47 of the right and left side plates 30, 40, respectively. That is, the surfaces 56 and 66 are expanded which provide more surface area for attaching to the outer surfaces 37 and 47, respectively.

As shown in FIGS. 2 and 3, right and left clearance plates 70, 73 are attached, for example by spot welding, via top surfaces 71, 74 to the bottom surfaces 53, 63 of the flanges 50, 60, respectively. The clearance plates 70, 73 are provided for the purpose of allowing the apparatus 1 to fit over existing impingement plates or other hardware that may be attached to the vane shroud 2. The bottom surfaces 72, 75 of the clearance plates 70, 73 are then welded by welds 96 to the frame of the inner shroud 2 as shown in FIGS. 2 and 6 when the apparatus 1 is being mounted.

As shown in FIGS. 2 and 3, front and rear reinforcement plates 80, 83 are attached, for example by spot welding to the bottom of the front and rear portions 24, 22 of the filter support 20, respectively. The reinforcement plates 80, 83 are provided for the purpose of locally increasing the metal thickness such that the apparatus 1 is configured to be attached to the frame of the inner shroud 2 using welds of sufficient size. That is, the bottom surfaces 82, 85 of the plates 80, 83 are welded by welds 96 to the frame of the inner shroud 2, as shown in FIGS. 2 and 6, during mounting of the apparatus 1.

The debris filter apparatus 1 is further configured such that the method by which the flow paths to the inlet 3 of two vane cooling channels 6 are left unobstructed while a seal is achieved between the filter apparatus 1 and the vane 7 in the vicinity of the cooling channel inlet 3. This is achieved through the use of right and left corner sealing pieces 90, 93. More specifically, as shown in FIGS. 1 and 3, the flange recess sealing surfaces 91, 94 of the sealing pieces 90, 93 are welded to the parallelogram-shaped front recess portions 59, 69 of the flanges 50, 60, respectively. For final assembly, a weld 96 is added between the bottom surfaces 92, 95 of the sealing pieces 90, 93 and the vane 7 to create the seal.

Attaching an embodiment of the filter apparatus 1 to an existing (retrofit) or a new turbine vane may require sufficient clearance in all locations outside of the filter 10 (away from the vane 7) and inside the filter 10 (towards the vane 7, between the filter 10 and the vane cooling holes 4). Because of differential thermal expansion within the turbine during operation, a gap (not shown) around the outside of the filter apparatus 1 between the filter apparatus 1 and the adjacent turbine components must exist at assembly. These constraints may limit the total height of the filter apparatus to approximately 3 cm. Considerations in the selection of a method of fastening the filter apparatus 1 to the vane shroud 2 include: thermal distortion of the vane 7 during operation and its effect on the frame of the filter apparatus 1; the potential for thermal distortion of the vane 7 during the fastening process; and the potential for leakage gaps between the vane shroud 2 and the frame of the filter apparatus 1 around the perimeter of the frame of the turbine vane 7.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

REFERENCE LIST

Debris filter assembly 1, inner shroud 2, air inlet opening 3, turbine vane cooling holes 4, air flow 5, cavity or cooling channel 6, turbine vane 7, cross flow 8.

Filter 10, rear portion 12, front portion 14, non-planar geometry portion 15, corrugated segments 16.

Filter support 20, rear portion 22, front portion 24, right non-planar geometry section 25, left non-planar geometry section 26, opening 27, right edge portion 28, left edge portion 29.

Right side plate 30, bottom edge surface 33, outer surface 37, inner surface 38, front recessed portion 39.

Left side plate 40, bottom edge surface 43, outer surface 47, inner surface 48, front recessed portion 49.

Right side flange 50, bottom surface 53, inner edge expanded surface 56, rear recess portion 58, front recess portion 59.

Left side flange 60, bottom surface 63, inner edge expanded surface 66, rear recess portion 68, front recess portion 69.

Front clearance plate 70, top surface 71, bottom surface 72, rear clearance plate 73, top surface 74, bottom surface 75.

Right reinforcement plate 80, bottom surface 82, left reinforcement plate 83, bottom surface 85.

Right corner sealing piece 90, flange recess sealing surface 91, bottom surface 92, left corner sealing piece 93, flange recess sealing surface 94, bottom surface 95.

Rear portion 122, front portion 124, right non-planar geometry section 125, left non-planar geometry section 126, opening 127.

We claim:

1. A turbine vane debris filter apparatus for preventing clogging of cooling holes of a turbine vane, the apparatus comprising:
    a filter comprising non-planar geometry configured to be disposed upon a shroud of the turbine vane; and
    a support comprising:
    an interface to which the filter is attached; and
    an opening for allowing air flow;
    wherein the interface is configured to receive and support the non-planar geometry and the opening is configured to align with an air inlet of the shroud; and
    wherein the support comprises matching geometry to the non-planar geometry.

2. The apparatus of claim 1, wherein the support comprises the shroud of the turbine vane.

3. The apparatus of claim 1, wherein the support comprises an assembly plate.

4. The apparatus of claim 3, wherein the non-planar geometry comprises at least one corrugated section.

5. The apparatus of claim 4, wherein the matching geometry includes a first corrugated section and a second corrugated section with the opening provided between the first and second corrugated sections.

6. The apparatus of claim 1, wherein the filter is larger in perimeter than the opening.

7. The apparatus of claim 1, wherein the shroud complises an inner shroud.

8. The apparatus of claim 1, wherein the shroud complises an outer shroud.

9. An existing gas turbine that is retrofitted with the apparatus according to claim 3.

10. A debris filter apparatus configured to be attached to a shroud of a turbine vane for preventing clogging of turbine vane cooling holes comprising:
    a support including non-planar geometry and an opening for allowing air flow;
    wherein the non-planar geometry is configured to receive a filter having matching non-planar geometry, and the opening is configured to align with an air inlet of the shroud.

11. The apparatus of claim 10, wherein the support comprises the shroud of the turbine vane.

12. The apparatus of claim 10, wherein the support comprises an assembly plate.

13. The apparatus of claim 12, wherein the non-planar geometry comprises at least one corrugated section.

14. The apparatus of claim 13, wherein the support non-planar geometry includes a first corrugated section and a second corrugated section with the opening provided between the first and second corrugated sections.

15. The apparatus of claim 10, wherein the filter is larger in perimeter than the opening.

16. The apparatus of claim 10, wherein the shroud comprises an inner shroud.

17. The apparatus of claim 10, wherein the shroud comprises an outer shroud.

18. An existing gas turbine that is retrofitted with the apparatus according to claim 12.

* * * * *